Patented Sept. 19, 1922.

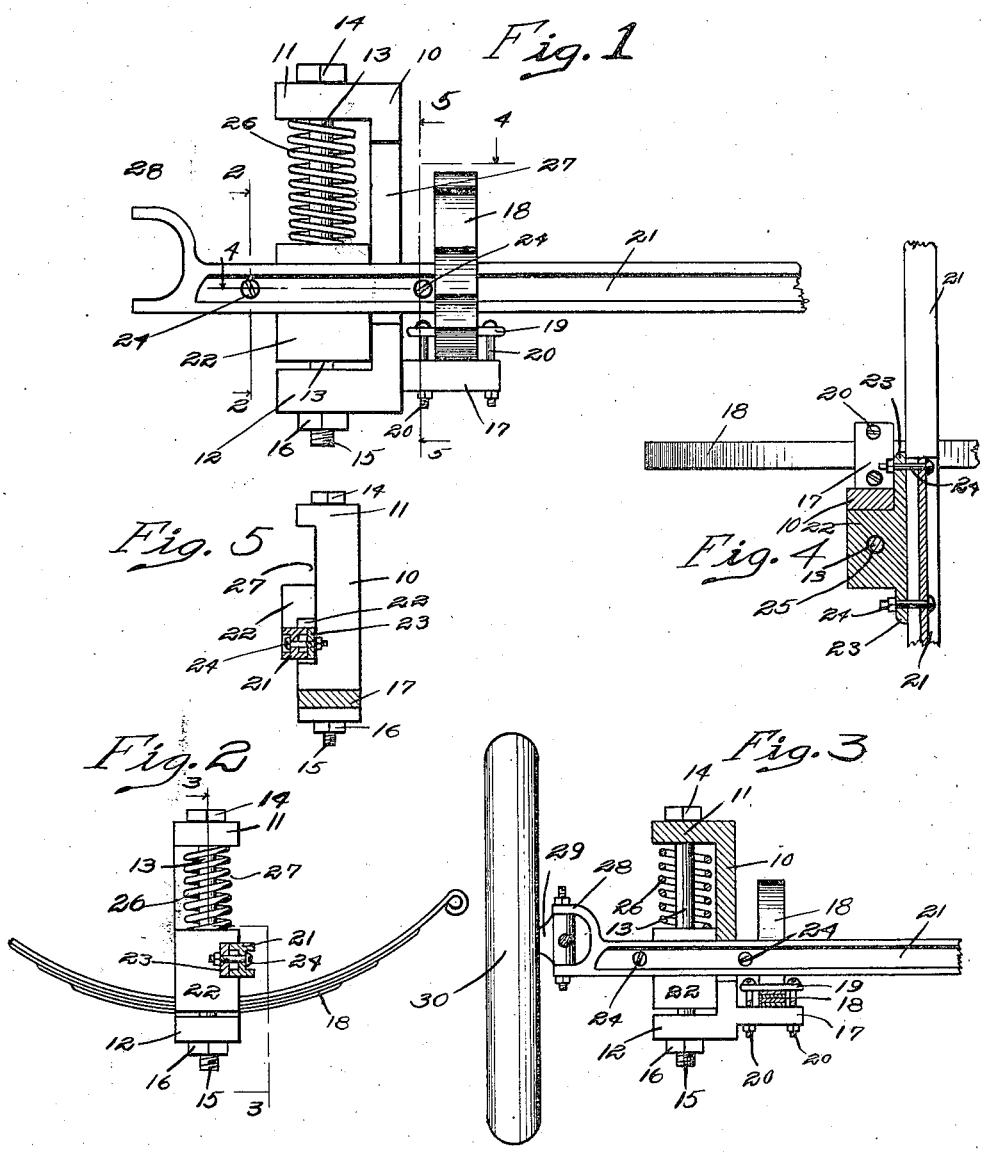

1,429,279

UNITED STATES PATENT OFFICE.

EDWARD FRANK FROMM, OF IOWA FALLS, IOWA, ASSIGNOR OF ONE-HALF TO WILLIAM DUNNING, OF IOWA FALLS, IOWA.

SPRING STRUCTURE.

Application filed September 21, 1921. Serial No. 502,094.

*To all whom it may concern:*

Be it known that I, EDWARD F. FROMM, a citizen of the United States, residing at Iowa Falls, in the county of Hardin and State of Iowa, have invented a certain new and useful Spring Structure, of which the following is a specification.

The object of my invention is to provide a spring structure for vehicles of simple, durable and comparatively inexpensive construction.

More particularly my invention relates to a spring structure whereby the axle of the vehicle may be so mounted that it is capable of movement independently of the ordinary leaf spring to which the vehicle body is secured.

Still another object is to provide such a spring structure wherein a housing is employed to which is secured the ordinary leaf spring of the vehicle, the housing being so arranged that the axle of the vehicle is capable of movement relative to the housing so that a double spring effect is given to the load carried.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is a side elevation of my improved spring structure.

Figure 2 is a sectional view taken on the line 2—2 of Figure 1.

Figure 3 is a sectional view taken on the line 3—3 of Figure 2 showing the arrangement of the axle relative to the vehicle wheel.

Figure 4 is a detail, sectional view taken on the line 4—4 of Figure 1 showing how the block member of the device is secured to the axle; and Figure 5 is a detail, sectional view taken on line 5—5 of Figure 1.

In the accompanying drawings I have used the reference numeral 10 to indicate generally the housing member of my device, which housing member is provided with the upper and lower right-angled extensions 11 and 12.

The extensions 11 and 12 are provided with a spindle 13 which is in the form of a bolt having a head 14 thereon and having its lower end screw threaded as at 15.

The screw threaded portion of the spindle is designed to receive the nut 16.

Extended oppositely from the lower extension 12 and formed on the housing member 10 is a lug or support 17. The support 17 has an ordinary leaf spring 18 resting thereon. A clamp device 19 extends around the center of the leaf spring 18 and has the bolts 20 thereof extending through the lug 17 as clearly shown in Figure 3 of the drawings.

It will be understood that the leaf spring 18 is of the ordinary construction and is usually secured to the vehicle body for carrying the load.

From the construction of the parts just described it will be seen that the housing member 10 will move up or down due to the resiliency of the leaf spring 18.

In order to mount the axle 21 of the vehicle so as to receive the greatest amount of shock resisting effect I provide a block member 22 which has a pair of oppositely extended flanges 23 formed thereon. The flanges 23 rest adjacent to the axle 21 and is secured thereto by means of the bolts 24.

The block member 22 is provided with an opening 25 which receives the spindle 13. The block member 22 is capable of sliding movement upon the spindle 13 and between the upper extension 11 and the lower extension 12 of the housing 10.

A coil spring 26 is received on the spindle 13 and has its lower end received against the upper surface of the block member 22 and has its upper end resting against the under surface of the extension 11 as clearly illustrated in Figure 1 of the drawings.

A portion of the housing member 10 is cut away as at 27 which permits the axle to move up and down without striking against the housing member 10.

The outer end of the axle 21 is forked as at 28 so as to receive the spindle 29 having the wheel 30 rotatably mounted thereon.

From the construction of the parts just described it will be seen that the axle 21 is capable of moving up and down due to the sliding of the block 22 on the spindle 13. The coil spring 26 will yieldingly hold the block member 22 in its downward position.

The leaf spring 18 which usually supports the load is so connected to the housing member 10 that any movement of the leaf spring 18 will permit the entire housing member and axle to move therewith, the result being that the axle 21 may move up and down without any movement of the spring 18.

This makes it possible for the spring 26 to cushion any of the slight jars or bumps that the wheel 30 may receive while both the leaf spring 18 and the coil spring 26 will be able to take care of any of the greater shocks received in travel.

My device is simple and can readily be installed upon any vehicle.

In the drawings I have shown my device as applicable to the front wheels of a motor vehicle but it will be understood that my spring structure may be employed upon any type of vehicle and may be used for either the front or the rear axle, when used for the rear axle the forked portion 28 is eliminated.

Some changes may be made in the construction and arrangement of the parts of my spring structure without departing from the real spirit and purpose of my invention, and it is my intention to cover by my claim, any modified forms of structure or use of mechanical equivalents, which may be reasonably included within its scope.

I claim as my invention:

A spring structure of the class described including in combination with a leaf spring and a vehicle axle, a housing member, said housing member comprising a bracket secured to said leaf spring for arranging the housing member on one side thereof, a pair of extension members spaced from each other, having registering openings therein, a guide element mounted in said openings, a block slidably mounted on said guide element capable of sliding movement between said pair of extensions, a pair of flanges formed on said block for fastening the axle thereto and a spring arranged on said guide element between one of said pair of extensions and said block for yieldingly resisting any movement of the block in one direction, the parts being so arranged that the axle may move bodily independent of the movement of the leaf spring.

Des Moines, Iowa, September 7, 1921.

EDWARD FRANK FROMM.